United States Patent [19]

Kodama et al.

[11] Patent Number: 4,535,650
[45] Date of Patent: Aug. 20, 1985

[54] FOUR-WHEEL DRIVING APPARATUS WITH AN AUTOMATIC TRANSMISSION

[75] Inventors: Masayuki Kodama, Hachioji; Toshio Kobayashi, Tokyo, both of Japan

[73] Assignee: Fuji Jukogyo Kabushiki Kaisha, Tokyo, Japan

[21] Appl. No.: 333,219

[22] Filed: Dec. 21, 1981

[30] Foreign Application Priority Data

Dec. 24, 1980 [JP] Japan .................................. 55-183370
Dec. 24, 1980 [JP] Japan ........................... 55-186083[U]
Dec. 24, 1980 [JP] Japan ........................... 55-186084[U]
Dec. 24, 1980 [JP] Japan ........................... 55-186085[U]

[51] Int. Cl.³ .............................................. F16H 37/06
[52] U.S. Cl. .................................. 74/665 GA; 180/247
[58] Field of Search ........................ 180/247, 251, 245; 74/665 GC, 665 GA, 665 GE, 665 T, 705

[56] References Cited

U.S. PATENT DOCUMENTS 4,014,221  3/1977  Eastwood ...................... 74/665 GA
4,241,621 12/1980  Kodama .............................. 180/247
4,356,879 11/1982  Uchiyama .......................... 180/247

FOREIGN PATENT DOCUMENTS

566854 12/1958  Canada .......................... 74/665 GA
876046  3/1953  Fed. Rep. of Germany ...... 180/247
1480674  3/1969  Fed. Rep. of Germany ...... 180/247
2405718 10/1974  Fed. Rep. of Germany ....... 180/247
0039841  3/1980  Japan .................................. 180/247
0146425 11/1981  Japan .................................. 180/247
0154329 11/1981  Japan .................................. 180/251
0154328 11/1981  Japan .................................. 180/251
0069142  4/1982  Japan ................................. 74/665 T
 814042  5/1959  United Kingdom ................ 180/247

Primary Examiner—George H. Krizmanich
Assistant Examiner—Dirk Wright
Attorney, Agent, or Firm—Martin A. Farber

[57] ABSTRACT

A four-wheel driving apparatus with an automatic transmission for a vehicle comprises an output shaft of the automatic transmission, a driving gear secured to a front end portion of the output shaft. A driving pinion shaft operatively connected to the driving gear by a driven gear and a pinion formed on one end of the driving pinion shaft is connected to a front final reduction device for driving front wheels of the vehicle. A rear drive shaft is rotatably supported and rearwardly extends along the outside of the automatic transmission. A driven gear is rotatably mounted on the rear drive shaft and connected to the driving gear through an intermediate gear. A clutch is provided on the rear drive shaft for transmitting the rotation of the driven gear to the rear drive shaft for driving rear wheels of the vehicle.

11 Claims, 14 Drawing Figures

FOUR-WHEEL DRIVING APPARATUS WITH AN AUTOMATIC TRANSMISSION

BACKGROUND OF THE INVENTION

The present invention relates to a four-wheel driving apparatus with an automatic transmission for vehicles, and more particularly to an arrangement of a driving system for front of a vehicle and a driving system for the rear wheels of the vehicle.

This kind of driving apparatus is disclosed in Japanese patent application laid-open No. 56-43031. In the disclosed apparatus, the driving system for the front wheels is constructed as a main driving system and driving system for the rear wheels is arranged to be selectively coupled to the main driving system. A final reduction gear device for the front wheels is disposed between a torque converter and an automatic transmission device. An output shaft connected to a planetary gear device is extended forwardly and operatively connected to a pinion shaft for the final reduction gear device through a drive gear and driven gear, thereby driving the front wheels.

In order to transmit the output of the automatic transmission to the rear wheels, the pinion shaft is connected to a transfer drive shaft. The transfer drive shaft extends rearwardly passing through a space formed beneath the planetary gear device and brake and clutch devices. The rear end portion of the transfer drive shaft is connected to a rear drive shaft through transfer gears and a clutch for transmitting the output to the rear wheels.

Therefore, the pinion shaft must transmit the output to both of the front wheels and the rear wheels, which will overload the shaft on the power transmission.

In addition, since the transfer drive shaft must extend between the brake and clutch devices and an oil supply control device, the construction is complicated. Further, the oil supply control device vibrates with the rotation of the transfer drive shaft, causing the oil pressure control to malfunction.

Since the transfer drive shaft is in a lower position, the transfer gears are provided to connect the transfer drive shaft with the rear drive shaft which is in a higher position. In addition to the transfer gears, a clutch for driving the rear wheels is positioned adjacent the transfer gears. Therefore, a large space for the transfer gears and clutch must be provided on the rear side of the automatic transmission. The enlarged rear portion of the automatic transmission extends into the passenger's compartment of the vehicle thereby decreasing the capacity of the compartment.

SUMMARY OF THE INVENTION

The object of the present invention is to provide a four-wheel driving apparatus with an automatic transmission in which a transfer driving shaft is disposed to extend along the outside of the automatic transmission, whereby the automatic transmission and the device for driving the rear wheels are simple in construction and small in size, and malfunction of the oil pressure control due to the vibration of the transfer drive shaft may be prevented.

According to the present invention, there is provided a four-wheel driving apparatus with an automatic transmission for a vehicle having a torque converter connected to an engine mounted on the vehicle, and a turbine shaft of the torque converter for connecting a turbine of the torque converter with the automatic transmission, comprising an output shaft of the automatic transmission, the output shaft being forwardly extended, a driving gear secured to the output shaft, a driving pinion shaft operatively connected to the driving gear, a pinion formed on one end of the driving pinion shaft, a final reduction device operatively connected to the pinion for driving front wheels of the vehicle, a rear drive shaft rotatably supported and rearwardly extended along the outside of the automatic transmission, a driven gear rotatably mounted on the rear drive shaft and operatively connected to the driving gear, and a clutch device mounted on the rear drive shaft and adapted to connect the driven gear with said rear drive shaft for driving the rear wheels of the vehicle.

Other objects and features of the present invention will be fully described with reference to the accompanying drawings.

DETAILED DESCRIPTION OF THE PREFERRED EMBODIMENTS

Figure 1A:
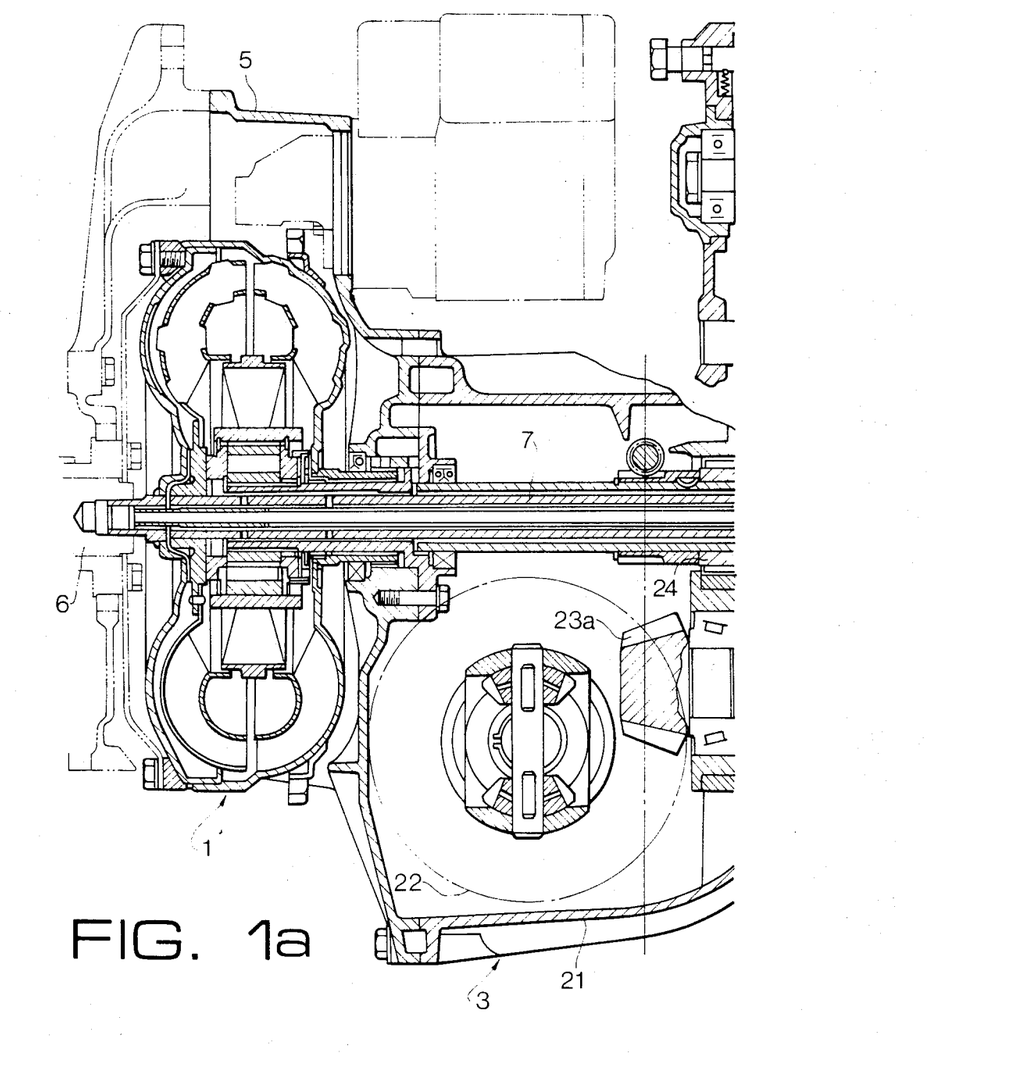
FIGS. 1a, 1b, and 1c in three sections are an axial sectional view, which is partially in developed view, of a four-wheel driving apparatus according to the present invention.
Figure 1B:
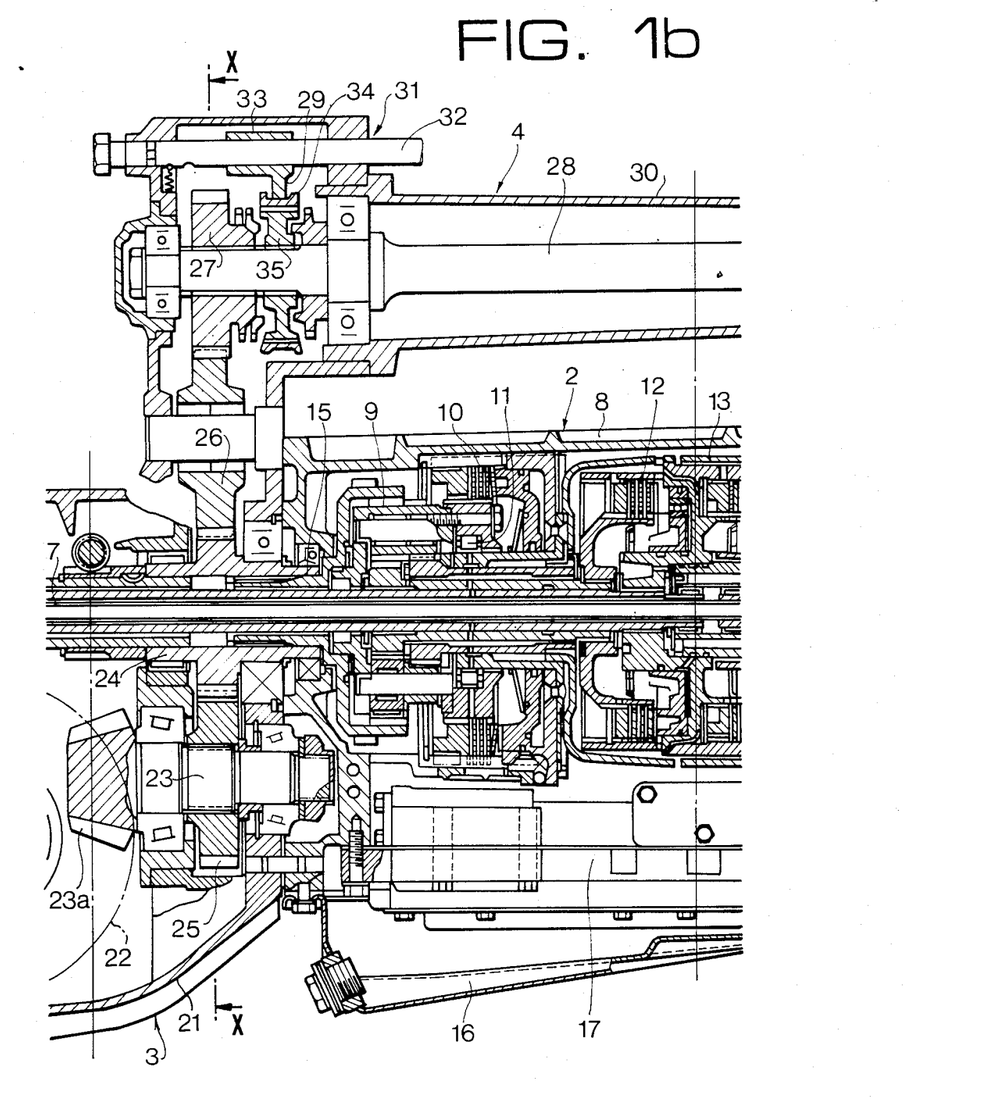
Figure 1C:
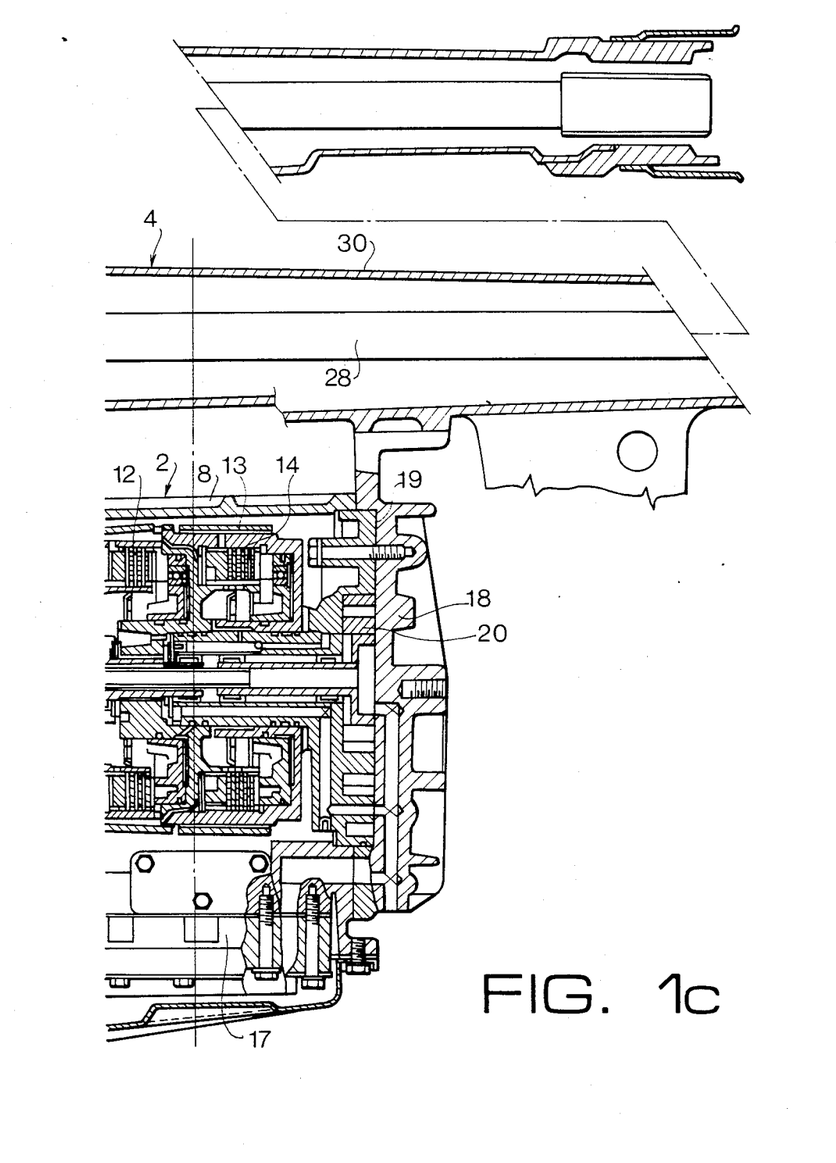
Figure 2:
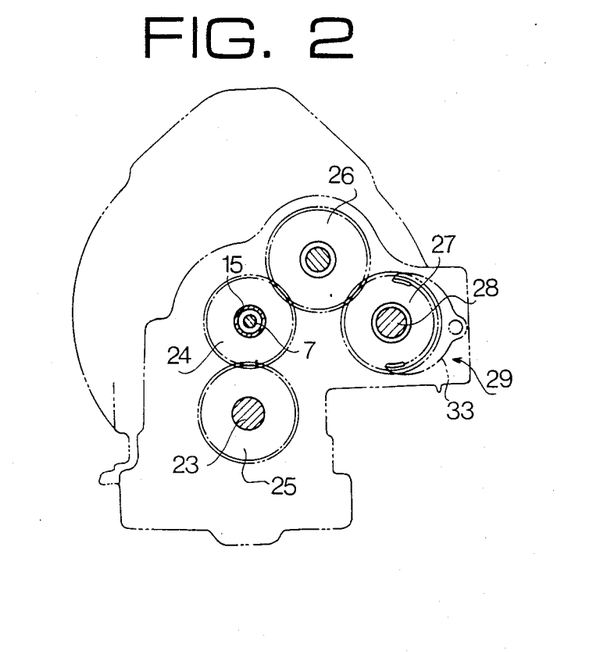
FIG. 2 is a sectional view taken along the line X—X of FIG. 1.

Referring to FIGS. 1 and 2, reference numeral 1 designates a torque converter. An automatic transmission 2 is arranged adjacent to the torque converter 1, a final reduction device 3 for front wheels of a vehicle (not shown) is disposed between the torque converter 1 and the automatic transmission 2, and a driving output transmitting device 4 for rear wheels (not shown) of the vehicle is disposed adjacent to one lateral side of the automatic transmission 2.

The torque converter 1 provided in a housing 5 comprises an impeller connected to a crankshaft 6 of an engine mounted on the vehicle (not shown) and a turbine connected to a turbine shaft 7 to transmit the power of the engine thereto.

The automatic transmission 2 provided in a transmission case 8 comprises a planetary gear 9, a low and reverse brake 10, a one-way clutch 11, a forward clutch 12 and a reverse clutch 14 with a brake band 13, which are arranged in a well known manner. A cylindrical output shaft 15 of the planetary gear 9 is disposed coaxially with the turbine shaft 7 and forwardly extended towards the torque converter 1. A pressure oil supply control device 17 for supplying the pressure oil to the brake 10, clutches 11 and 12 and other members is disposed between the automatic transmission mechanism and an oil pan 16. An oil pump 20 is provided between a rear cover 18 and a carrier 19.

This automatic transmission has a conventional operation. For example, when D-range is selected, the forward clutch 12 is engaged by pressure oil, the output of the turbine shaft 7 is transmitted to the planetary gear 9 and the vehicle is driven at an automatically changed transmission gear ratio.

The final reduction device 3 is provided in a case 21 secured to the converter housing 5 and to the transmission case 8. The reduction device 3 comprises a crown gear 22 which is secured to a differential for the front wheels and is engaged with a driving pinion 23a. A driving pinion shaft 23 is positioned immediately below the output shaft 15. A driving gear 24 is securely mounted on the output shaft 15 and a driven gear 25 engaged with the driving gear 24 is secured to the driving pinion shaft 23. Thus, the output of the automatic transmission is transmitted to the final reduction device 3 through the gears 24, 25 and pinion 23a.

The driving output transmitting device 4 for the rear wheels comprises an intermediate gear 26 meshed with the driving gear 24, and a driven gear 27 meshed with the intermediate gear 26. The intermediate gear 26 and the driven gear 27 are provided in the case 21 of the final reduction device 3. The gear 27 is positioned in a horizontal plane passing through the output shaft 15 as shown in FIG. 2. The gear 27 is rotatably mounted on a rear drive shaft 28 and is adapted to be connected to the rear drive shaft 28 through a clutch 29. The clutch 29 comprises a synchromesh mechanism 35 secured to the rear drive shaft 28. A sleeve 34 of the synchromesh mechanism 35 is shifted by a shifter 33 secured to a rod 32 of a four-wheel drive selecting device 31, so that the sleeve 34 may be engaged with teeth provided on one side of the gear 27, thereby connecting the gear 27 to the shaft 28. The rear drive shaft 28 extends in the rearward direction in an extension housing 30 and is connected through a propeller shaft (not shown) to a rear differential (also not shown) in a well known manner to drive the rear wheels.

In operation, the output transmitted to the automatic transmission through the torque converter 1 diverges the driving gear 24 into the front wheel driving system and the rear wheels driving system. The front wheel driving system transmits the output to the final reduction device 3 through the gear 25, pinion 23a and the crown gear 22. The rear wheel driving system transmits the output to the driven gear 27 through the intermediate gear 26.

When the clutch 29 is disengaged, the output is not transmitted to the rear wheels and only the front-wheel driving is performed. When the sleeve 34 is shifted by the shifter 33 to be engaged with the teeth of the gear 27, the output is transmitted to the front wheel driving system as well as to the rear drive shaft 28 through the clutch clutch 29 and further transmitted to the rear wheels. Thus, the vehicle is driven by four wheels.

Figure 3A:
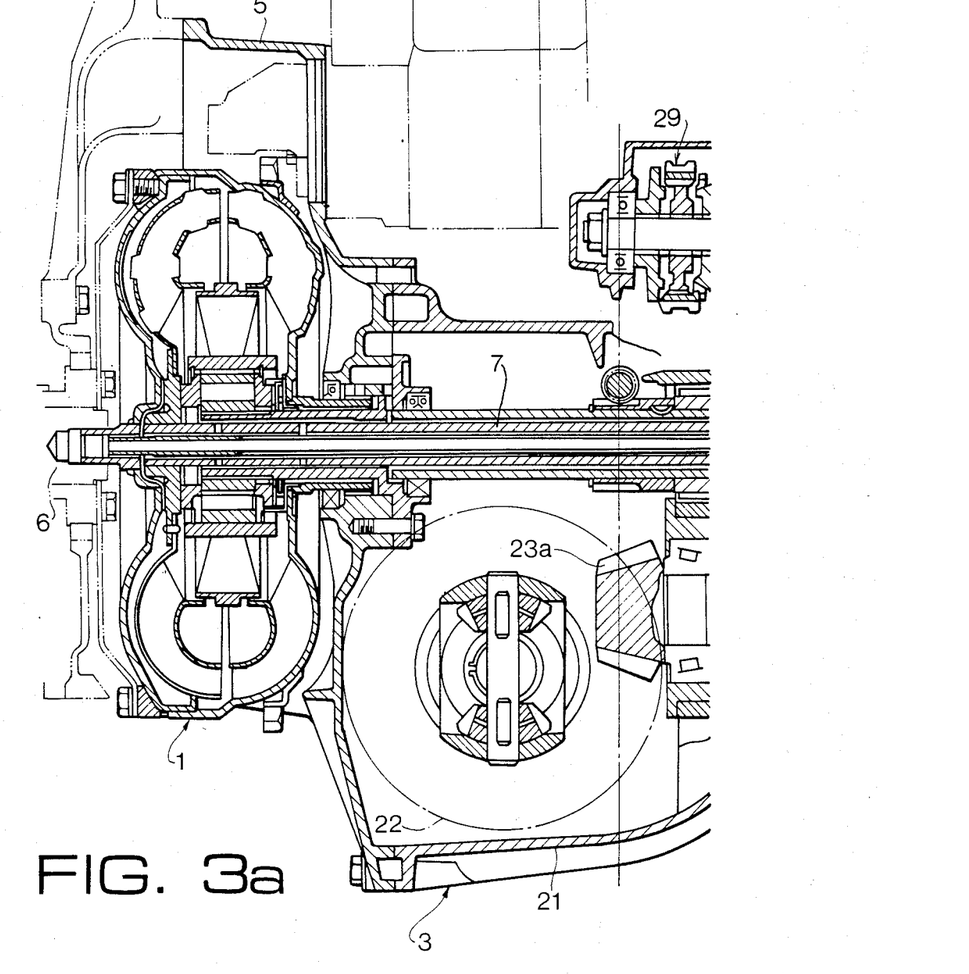
FIGS. 3a, 3b, and 3c in three sections are an axial sectional view, which is partially in developed view, showing another embodiment of the present invention.
Figure 3B:
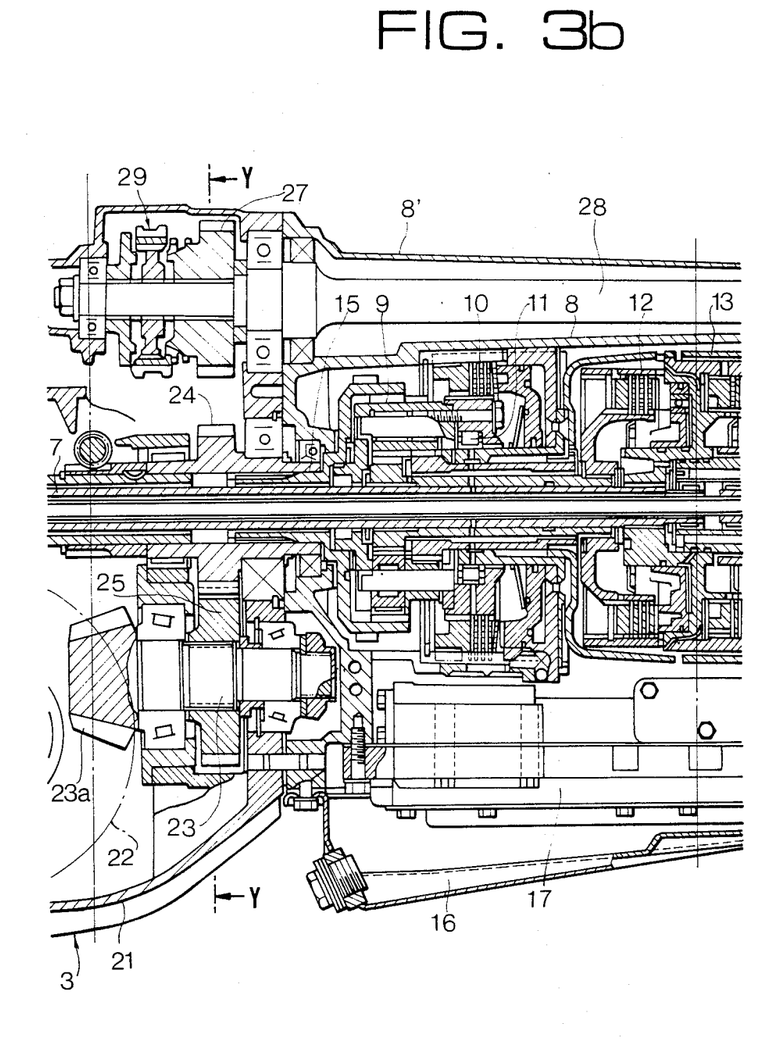
Figure 3C:
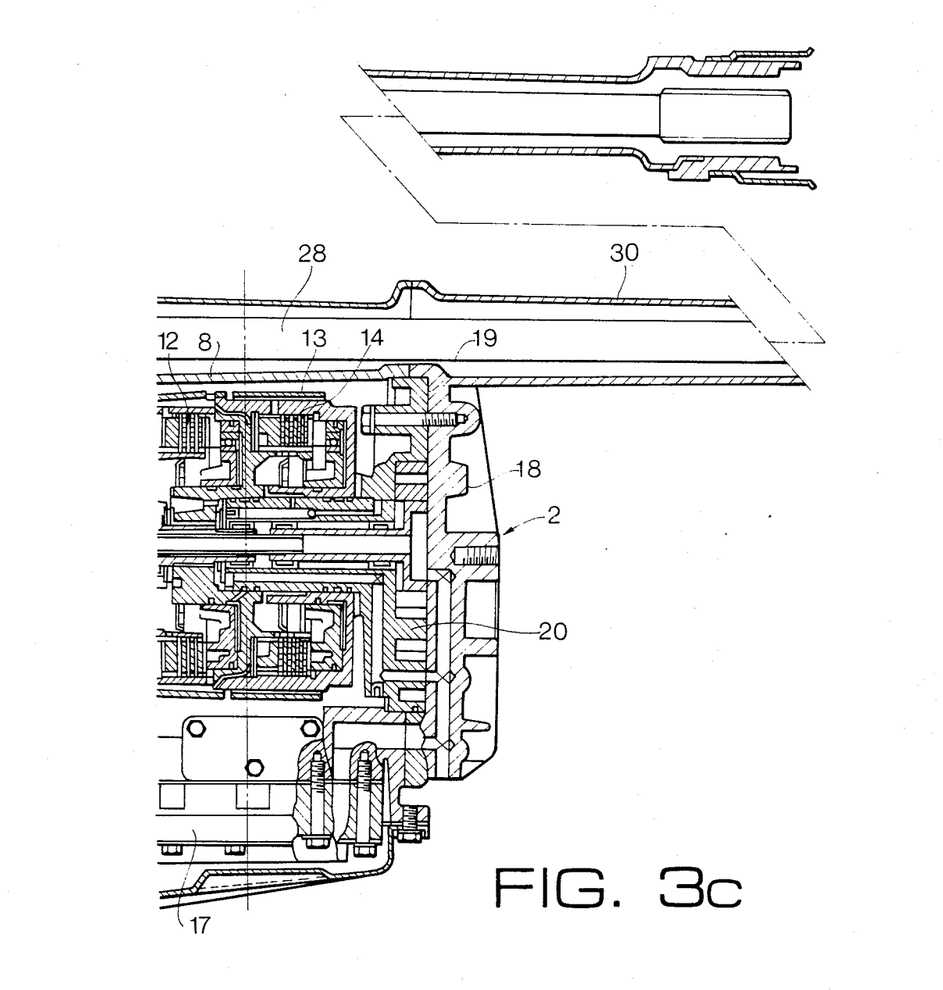
Figure 4:
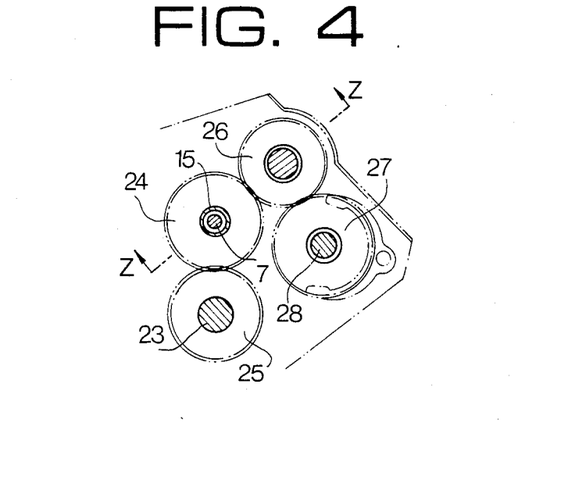
FIG. 4 is a sectional view taken along the line Y—Y of FIG. 3.
Figure 5:
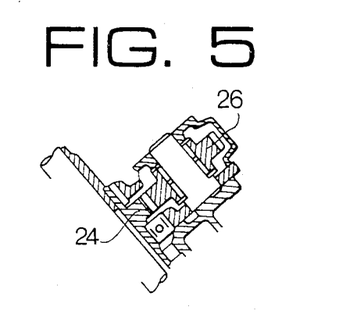
FIG. 5 is a sectional view taken along the line Z—Z of FIG. 4.

Referring to FIGS. 3 to 5, in this embodiment, the synchromesh mechanism 29 is securely mounted on the rear drive shaft 28 at the front side of the driven gear 27, and the synchromesh mechanism 29 and the gear 27 are covered by the case 21 of the final reduction device 3. The intermediate gear 26 is not shown in FIG. 3 but is shown in FIGS. 4 and 5. Moreover, a cylindrical cover 8' is formed extending from the transmission case 8 and the rear drive shaft 28 extends in the cylindrical cover 8'. An extension housing 38 is connected with the cylindrical case 8 so that the rear of the shaft 28 passes therethrough. Other parts are the same as in the previous embodiment and identified by the same numerals.

Figure 6A:
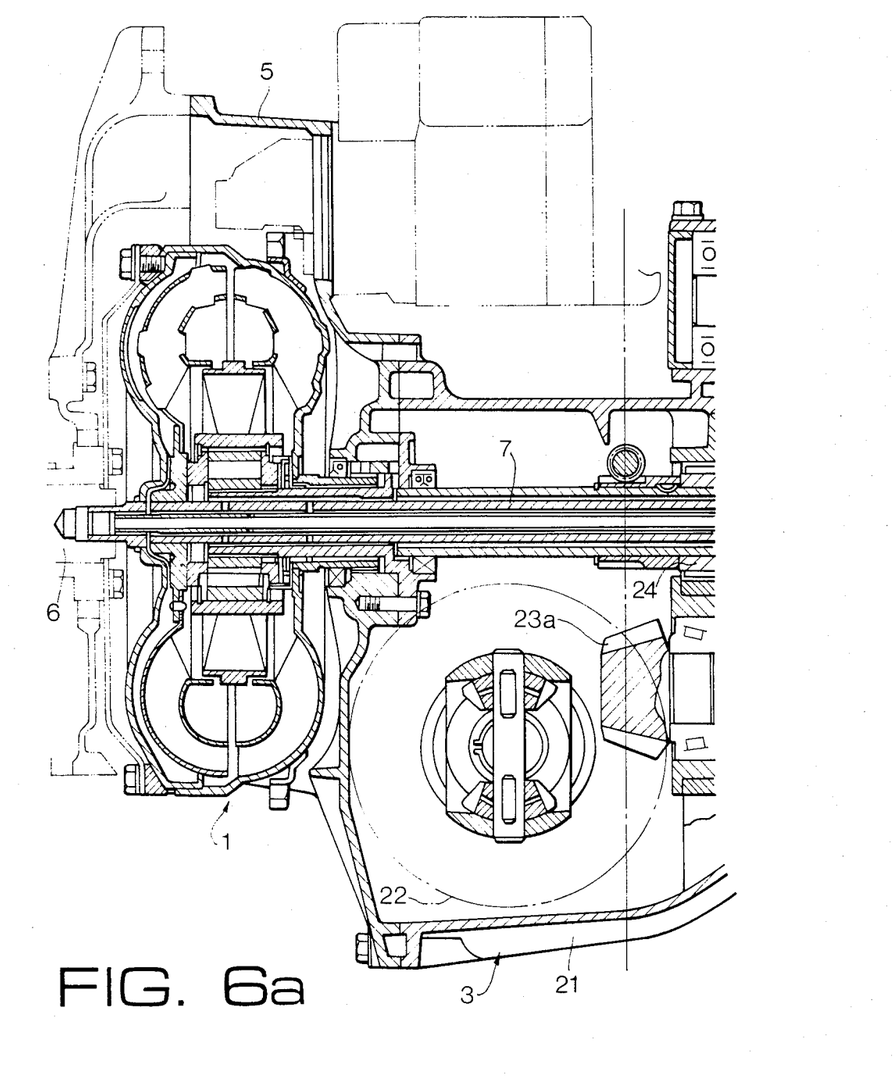
FIG. 6 is an axial sectional view showing further another embodiment of the present invention.
Figure 6B:
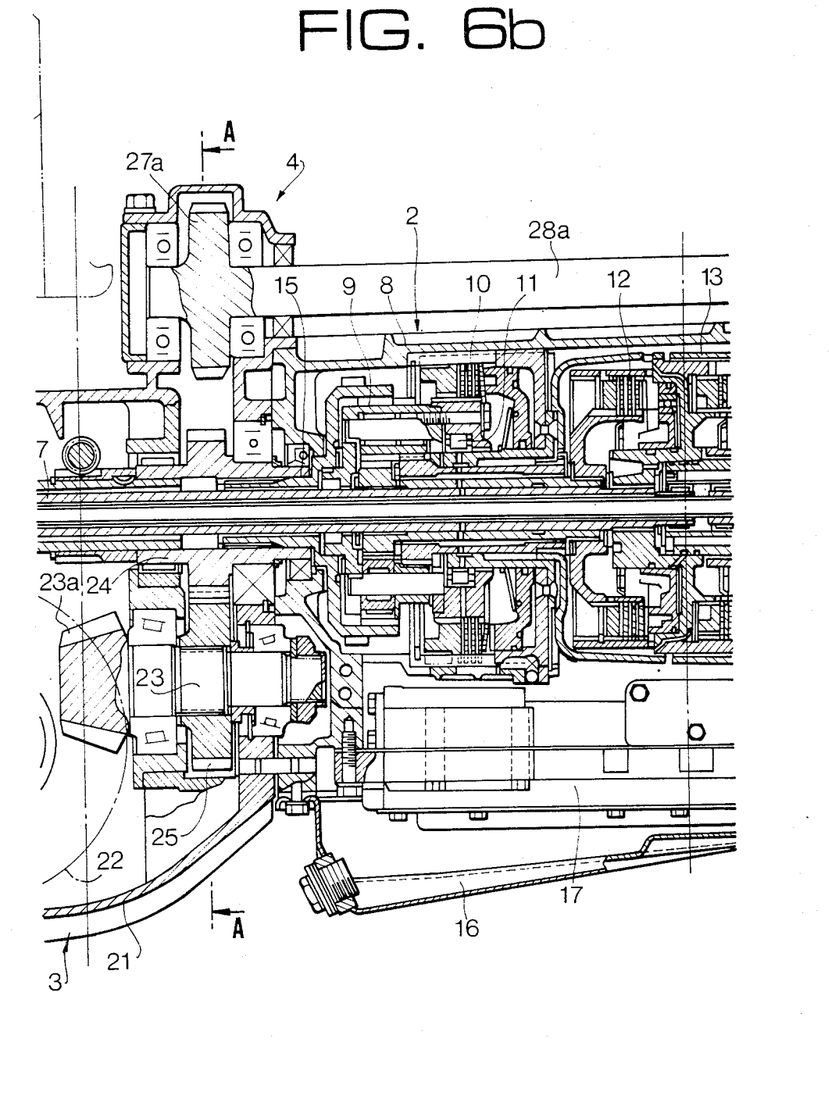
Figure 6C:
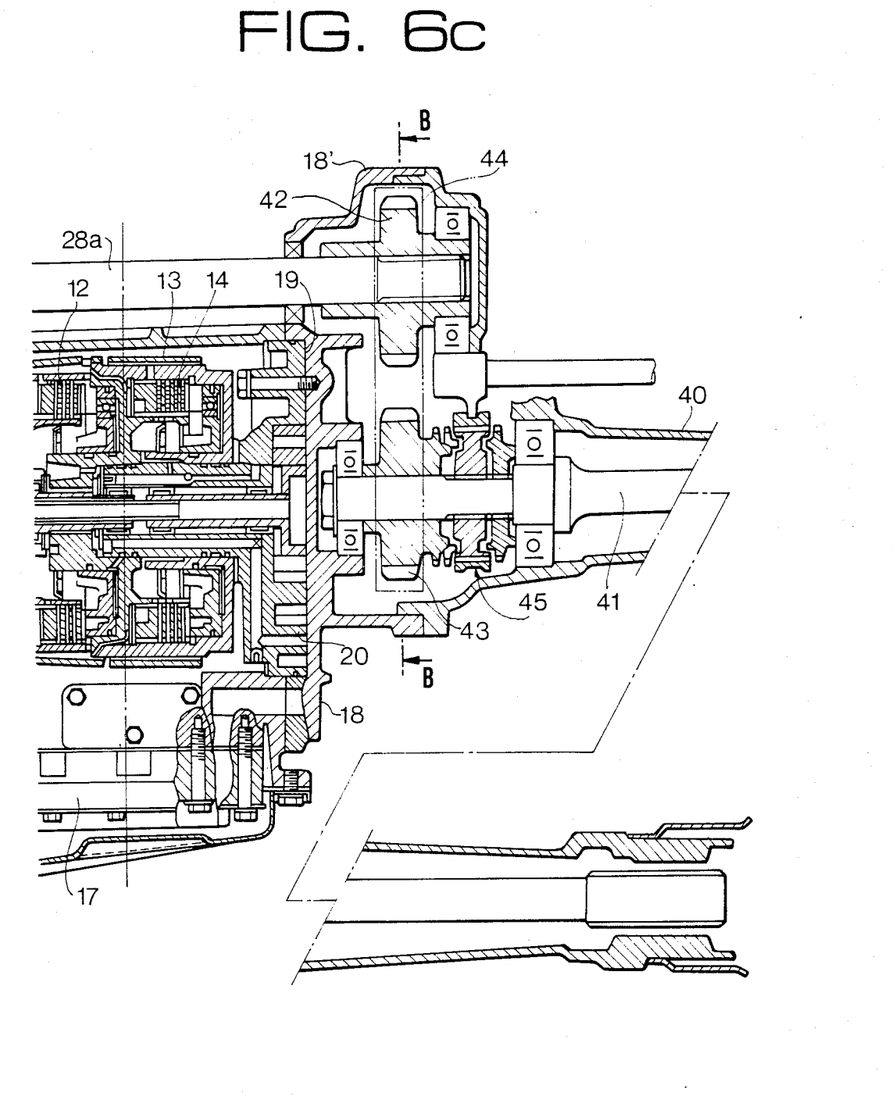
Figure 7:
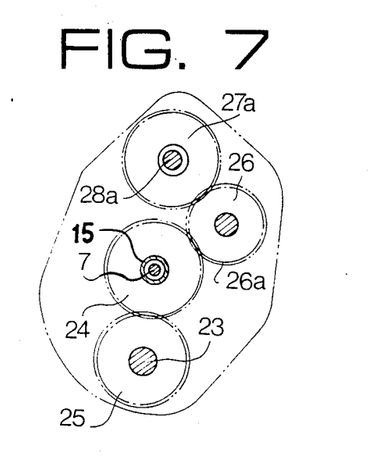
FIG. 7 is a sectional view taken along the line A—A of FIG. 6.
Figure 8:
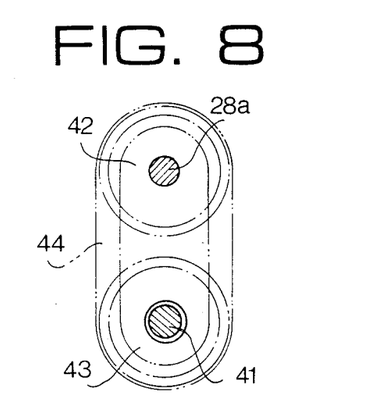
FIG. 8 is a sectional view taken along the line B—B of FIG. 6.

Referring to FIGS. 6 to 8, a driven gear 27a (not shown in FIG. 6 but shown in FIG. 7) corresponding to the driven gear 27 in the device of FIGS. 1 and 2 is secured to an intermediate shaft 28a, and the axes of the driven gear 27a and the shaft 28a are positioned in substantially a vertical plane including the axis of the output shaft 15 as shown in FIG. 7. The intermediate shaft 28a extends rearwardly is rotatably supported by a bearing provided in a housing 18' which extends from the transmission cover 18. An extension housing 40 is secured to the housing 18', in which a rear drive shaft 41 is substantially disposed in alignment with the turbine shaft 7 and is rotatably supported. A sprocket 42 is secured to the intermediate shaft 28a and a sprocket 43 is rotatably mounted on the rear drive shaft 41 and both sprockets are operatively connected by a chain 44. A synchromesh mechanism 45 is mounted on the rear drive shaft 41 so as to connect the sprocket 43 to the shaft 41 in the same manner as the device of 29, 32-35 FIG. 1. Other parts are the same as in the previous embodiments and identified by the same numerals.

In this system, the output of the automatic transmission is transmitted from the output driving gear 24 to the rear drive shaft 41 through the intermediate gear 26a, the driven gear 27a, the intermediate shaft 28a, the sprocket 42, the chain 44, the sprocket 43, and the synchromesh mechanism 45.

In all illustrative embodiments the axis of the rear drive shaft is disposed substantially in a horizontal plane including the axis of the output shaft 15.

In accordance with the present invention, the output of the automatic transmission diverges at the driving gear 24 fixed on the output shaft 15 into the front wheel driving system and the rear wheel driving system. Therefore, both driving systems are not influenced by each other, thereby offering a stable output transmission. Since the rear drive shaft 28 does not pass through the transmission, the construction is simplified and malfunctioning of the pressure oil supply control operation caused by the vibration of the rear drive shaft may be prevented.

What is claimed is:

1. In a four-wheel driving apparatus with an automatic transmission for a vehicle having a torque converter connected to an engine mounted on a vehicle and having a turbine shaft for connecting the output of the torque converter to said automatic transmission, the improvement comprising an output shaft of said automatic transmission, said output shaft being forwardly extended from the automatic transmission, a driving gear secured to the output shaft, a driving pinion shaft operatively connected to said driving gear, a pinion formed on one end of said driving pinion shaft, means comprising a final reduction device operatively connected to said pinion for driving front wheels of the vehicle;

a rear drive shaft rotatably supported and rearwardly extended along the outside of said automatic transmission, a driven gear rotatably mounted on said rear drive shaft and operatively connected to said driving gear, and a clutch device mounted on the rear drive shaft and adapted to connect said driven gear with said rear drive shaft for driving rear wheels of the vehicle.

2. A four-wheel driving apparatus with an automatic transmission for a vehicle according to claim 1 wherein said final reduction device is disposed between said torque converter and said automatic transmission, and said output shaft is cylindrical and coaxial with said turbine shaft.

3. A four-wheel driving apparatus with an automatic transmission for a vehicle according to claim 1 further comprising
an intermediate gear connecting said driven gear to said driving gear.

4. A four-wheel driving apparatus with an automatic transmission for a vehicle according to claim 1 further comprising
a case covering said final reduction device, said driven gear and said clutch.

5. A four-wheel driving apparatus with an automatic transmission for a vehicle according to claim 1 wherein
the axis of said rear drive shaft is disposed substantially in a horizontal plane including the axis of said output shaft.

6. A four-wheel driving apparatus with an automatic transmission for a vehicle having a torque converter connected to an engine mounted on said vehicle, and a turbine shaft of said torque converter for connecting a turbine of said torque converter with said automatic transmission, comprising
an output shaft of said automatic transmission, said output shaft being forwardly extended,
a driving gear secured to said output shaft,
a driving pinion shaft operatively connected to said driving gear,
a pinion formed on one end of said driving pinion shaft,
a final reduction device operatively connected to said pinion for driving front wheels of said vehicle,
a rear drive shaft rotatably supported and rearwardly extended at the outside of said automatic transmission,
a driven gear rotatably mounted on said rear drive shaft and operatively connected to said driving gear, and
a clutch device mounted on said rear drive shaft and adapted to connect said driven gear with said rear drive shaft for driving rear wheels of the vehicle,
an intermediate shaft extending along the outside of said automatic transmission,
said rear drive shaft being disposed substantially in alignment with said output shaft, and
means for transmitting the rotation of said intermediate shaft to said rear drive shaft.

7. The apparatus according to claim 6, wherein axes of said intermediate shaft, said output shaft and said driven gear are positioned substantially in a vertical plane.

8. The apparatus according to claim 1, further comprising
a transmission case in which said automatic transmission is disposed,
an extension housing communicatingly isolated from said transmission case, said rear drive shaft extending through said extension housing.

9. In a four-wheel driving apparatus having a torque converter connected to an engine mounted on a vehicle and having a turbine shaft for connecting the output of the torque converter to an automatic transmission, the improvement cooomprising
an output shaft of said automatic transmission, said output shaft being forwardly extended from the automatic transmission,
a driving gear secured to the output shaft,
a driving pinion shaft having a first driven gear operatively connected to the driving gear,
a pinion formed on one end of the driving pinion shaft,
means comprising a final reduction device operatively connected to the pinion for driving front wheels of the vehicle,
a rear drive shaft parallel with said output shaft and rotatably supported and located at a lateral position relative to the output shaft and higher then the driving pinion shaft and rearwardly extended along the outside of said automatic transmission,
a second driven gear rotatably mounted on the rear drive shaft and operatively connected to the driving gear independently of the first driven gear, and
a clutch device mounted on the rear drive shaft and adapted to connect said second driven gear with the rear drive shaft for driving rear wheels of the vehicle.

10. In a four-wheel driving apparatus with an automatic transmission for a vehicle having a torque converter connected to an engine mounted on said vehicle and having a turbine shaft for connecting the output of the torque converter to said automatic transmission, the improvement comprising
an output shaft of said automatic transmission, said output shaft being forwardly extended from the automatic transmission,
a driving gear secured to the output shaft,
a driving pinion shaft having a first driven gear operatively connected to said driving gear,
a pinion formed on one end of said driving pinion shaft,
means comprising a final reduction device operatively connected to said pinion for driving front wheels of the vehicle,
a rear drive shaft rotatably supported and rearwardly extended along the outside of said automatic transmission, and
a clutch means for operatively connecting said driving gear with the rear drive shaft for driving rear wheels of the vehicle.

11. The apparatus according to claim 10, further comprising
a transmission case in which said automatic transmission is disposed,
an extension housing communicatingly isolated from said transmission case, said rear drive shaft extends through said extension housing.

* * * * *